United States Patent
Sarkar et al.

(10) Patent No.: US 10,437,810 B2
(45) Date of Patent: Oct. 8, 2019

(54) SYSTEMS AND METHODS FOR MAINTAINING CARDINALITY SCHEMA TO PREVENT CORRUPTION IN DATABASES INDIFFERENT TO CARDINALITY

(71) Applicant: Microsoft Technology Licensing, LLC, Redmond, WA (US)

(72) Inventors: Angshuman Sarkar, Bellevue, WA (US); Henrik Frystyk Nielsen, Hunts Point, WA (US); John Anthony Taylor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 15/282,955

(22) Filed: Sep. 30, 2016

(65) Prior Publication Data

US 2018/0096015 A1 Apr. 5, 2018

(51) Int. Cl.
*G06F 16/00* (2019.01)
*G06F 16/23* (2019.01)
(Continued)

(52) U.S. Cl.
CPC ............ *G06F 16/23* (2019.01); *G06F 16/211* (2019.01); *G06F 16/2365* (2019.01); *G06F 16/2455* (2019.01); *G06F 16/9024* (2019.01)

(58) Field of Classification Search
CPC combination set(s) only.
See application file for complete search history.

(56) References Cited

U.S. PATENT DOCUMENTS

| 6,985,890 B2 | 1/2006 | Inokuchi |
| 8,671,074 B2 * | 3/2014 | Wang ...................... G06F 9/466 |
| | | 707/634 |

(Continued)

FOREIGN PATENT DOCUMENTS

| WO | 2006121338 A2 | 11/2006 |
| WO | 2014105640 A1 | 7/2014 |

OTHER PUBLICATIONS

Ramachandran, Sridhar, "From the entity-relationship to the property-graph model," Published on: Jan. 7, 2014 Available at: http://lambdazen.blogspot.in/2014/01/from-entity-relationship-to-property.html.

(Continued)

*Primary Examiner* — Farhan M Syed
(74) *Attorney, Agent, or Firm* — Michael Best & Friedrich LLP

(57) ABSTRACT

A facility maintains a cardinality schema to manage indications of property cardinality on behalf of a database such as a graph database that is indifferent to the cardinality of properties stored within it. The facility can add cardinality indications to the cardinality schema for a property based on (1) semantics used to refer to one or more values of the property in an update request, (2) the number of values specified for the property in an update request, or (3) an explicit client declaration of the property's cardinality. Where a query or update request against the database uses cardinality semantics for a property that are inconsistent with the cardinality schema's indication for the property, the facility can reject the query or update request. The facility can also use the cardinality schema to automatically complete incomplete queries using the proper cardinality semantics for each involved property.

16 Claims, 12 Drawing Sheets

(51) Int. Cl.
*G06F 16/21* (2019.01)
*G06F 16/2455* (2019.01)
*G06F 16/901* (2019.01)

(56) References Cited

U.S. PATENT DOCUMENTS

| | | | |
|---|---|---|---|
| 8,674,993 | B1 | 3/2014 | Fleming et al. |
| 8,706,764 | B2* | 4/2014 | Sivasubramanian ... G06F 12/02 707/792 |
| 8,819,078 | B2 | 8/2014 | Roy et al. |
| 8,880,682 | B2* | 11/2014 | Bishop ............... G06F 11/3495 709/224 |
| 8,954,441 | B1 | 2/2015 | Baranov et al. |
| 9,311,731 | B2 | 4/2016 | Mizell |
| 9,378,239 | B1 | 6/2016 | Long et al. |
| 2009/0198651 | A1* | 8/2009 | Shiffer ............... G06F 16/254 |
| 2010/0250748 | A1* | 9/2010 | Sivasubramanian ...................... G06F 9/5016 709/226 |
| 2010/0251002 | A1* | 9/2010 | Sivasubramanian ...................... G06F 9/5061 714/2 |
| 2010/0251242 | A1* | 9/2010 | Sivasubramanian ... G06F 12/02 718/100 |
| 2011/0145657 | A1* | 6/2011 | Bishop ............... G06F 11/3495 714/47.1 |
| 2011/0251997 | A1* | 10/2011 | Wang ..................... G06F 9/466 707/634 |
| 2011/0302168 | A1 | 12/2011 | Aggarwal |
| 2012/0023066 | A1* | 1/2012 | Bourbonnais ....... G06F 11/1451 707/613 |
| 2012/0215810 | A1 | 8/2012 | Evans et al. |
| 2013/0066923 | A1* | 3/2013 | Sivasubramanian ... G06F 12/02 707/802 |
| 2013/0238667 | A1 | 9/2013 | Carvalho et al. |
| 2013/0318038 | A1* | 11/2013 | Shiffer ................. G06F 16/254 707/610 |
| 2014/0188935 | A1 | 7/2014 | Vee et al. |
| 2014/0310302 | A1 | 10/2014 | Wu et al. |
| 2015/0066989 | A1 | 3/2015 | Yu |
| 2015/0095353 | A1 | 4/2015 | Yehaskel et al. |
| 2018/0096039 | A1* | 4/2018 | Otaguro ............. G06F 16/9038 |
| 2018/0130092 | A1* | 5/2018 | Nahass ............. G06Q 30/0248 |
| 2018/0139507 | A1* | 5/2018 | Toksoz ................. H04L 65/602 |

OTHER PUBLICATIONS

Vasilyeva, et al., "Relaxation of Subgraph Queries Delivering Empty Results," In Proceedings of the 27th International Conference on Scientific and Statistical Database Management, Jun. 29, 2015, 12 pages.

Spadaccini, N., "Databases—Constraints and Triggers", Retrieved From: http://teaching.csse.uwa.edu.au/units/CITS2232/lectures/db-triggers.pdf, Dec. 31, 2010, 16 Pages.

Ghrab, et al., "GRAD: On Graph Database Modeling", Retrieved From https://arxiv.org/ftp/arxiv/papers/1602/1602.00503.pdf, Feb. 1, 2016, 28 Pages.

"International Search Report and Written Opinion Issued in PCT Application No. PCT/US2017/053855", dated Mar. 20, 2018, 18 Pages.

* cited by examiner

FIG. 4

| entity data / post call | no property X | single property X | multiple properties X |
|---|---|---|---|
| post X with scalar 42 | succeed; establish context: X is a scalar | succeed; establish context: X is a scalar | succeed; establish context: X is a scalar |
| post X with collection 42 | succeed; establish context: X is a collection | succeed; establish context: X is a collection | succeed; establish context: X is a collection | post result with no context — 400, 401, 402; 411, 412, 413, 414

FIG. 5

| entity data / post call | no property X | single property X | multiple properties X |
|---|---|---|---|
| post X with scalar 42 | succeed | fail | n/a |
| post X with collection 42 | fail | fail | fail | post result with context: X is a scalar — 500, 501, 502; 511, 512, 513, 514

| post call / entity data | no property X | single property X | multiple properties X |
|---|---|---|---|
| post X with scalar 42 | succeed | succeed | succeed |
| post X with collection 42 | succeed | succeed | succeed | post result with context: X is a collection

*FIG. 6*

| entity data query | no property X | single property X=42 | multiple properties X=42,64 | single property X=7 | multiple properties X=7,64 |
|---|---|---|---|---|---|
| scalar X = 42 | entity not in result | entity in result | error for entity | entity not in result | error for entity |
| collection X includes 42 | entity not in result | entity in result | entity in result | entity not in result | entity not in result | query result with no context ⸺1000

| entity data query | no property X | single property X=42 | multiple properties X=42,64 | single property X=7 | multiple properties X=7,64 |
|---|---|---|---|---|---|
| scalar X = 42 | entity not in result | entity in result | error for entity | entity not in result | error for entity |
| collection X includes 42 | error for entity | error for entity | error for entity | error for entity | error for entity | query result with context: X is a scalar ⸺1100

| query | entity data | | | |
|---|---|---|---|---|
| | | | | query result with context: X is a collection — 1200 |
| | no property X | single property X=42 | multiple properties X=42,64 | single property X=7 | multiple properties X=7,64 |
| scalar X = 42 | error for entity | error for entity | error for entity | error for entity | error for entity |
| collection X includes 42 | entity not in result | entity in result | entity in result | entity not in result | entity not in result |
| | 1212 | 1213 | 1214 | 1215 | 1216 |
| 1211 | | | | 1201 | 1202 |

*FIG. 12*

SYSTEMS AND METHODS FOR MAINTAINING CARDINALITY SCHEMA TO PREVENT CORRUPTION IN DATABASES INDIFFERENT TO CARDINALITY

BACKGROUND

Triplestores and subject-predicate-object databases store "triples" each representing a relationship between a pair of things. For example, such a database may contain the triple (Sandra, manages, Anthony). In this example, "Sandra" is the subject of the triple, "manages" is the predicate of the triple, and "Anthony" is the object of the triple. The triple represents a relationship between Sandra and Anthony in which Sandra is Anthony's manager.

Graph databases organize information by connecting pairs of nodes each with an edge. A graph database can be used to represent the contents of a triplestore or subject-predicate-object database; in particular, each triple is represented by establishing a first node corresponding to the subject of the triple, establishing a second node corresponding to the object of the triple, and establishing an edge from the first node to the second node corresponding to the predicate of the triple. In some cases, graph databases are used to represent the values of properties for entities: a first node represents an entity, such as a particular book; an edge exiting the first node represents a property identity, such as a title property; and a second node entered by the edge represents a value of the property represented by the edge for the entity represented by the first node, such as the title of the book represented by the first node.

Graph databases, subject-predicate-object databases, and triplestores have many similarities; can be used in many of the same situations; and can often be straightforwardly transformed between each other. They are favored for their flexibility, able to dynamically consume and organize data of arbitrary complexity without requiring that a structure be defined for the data in advance of its loading.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility maintains a cardinality schema to manage indications of property cardinality on behalf of a database such as a graph database that is indifferent to the cardinality of properties stored within it. The facility can add cardinality indications to the cardinality schema for a property based on (1) semantics used to refer to one or more values of the property in an update request, (2) the number of values specified for the property in an update request, or (3) an explicit client declaration of the property's cardinality. Where a query or update request against the database uses cardinality semantics for a property that are inconsistent with the cardinality schema's indication for the property, the facility can reject the query or update request. The facility can also use the cardinality schema to automatically complete incomplete queries using the proper cardinality semantics for each involved property.

BRIEF DESCRIPTION OF THE DRAWINGS

FIG. 4 is a table diagram showing logic used by the facility in some embodiments to perform act 305.

FIGS. 5 and 6 are table diagrams showing logic used by the facility in some embodiments to perform act 307.

FIGS. 10-12 are table diagrams showing logic used by the facility in some embodiments to perform acts 905 and 907.

DETAILED DESCRIPTION

Figure 1:
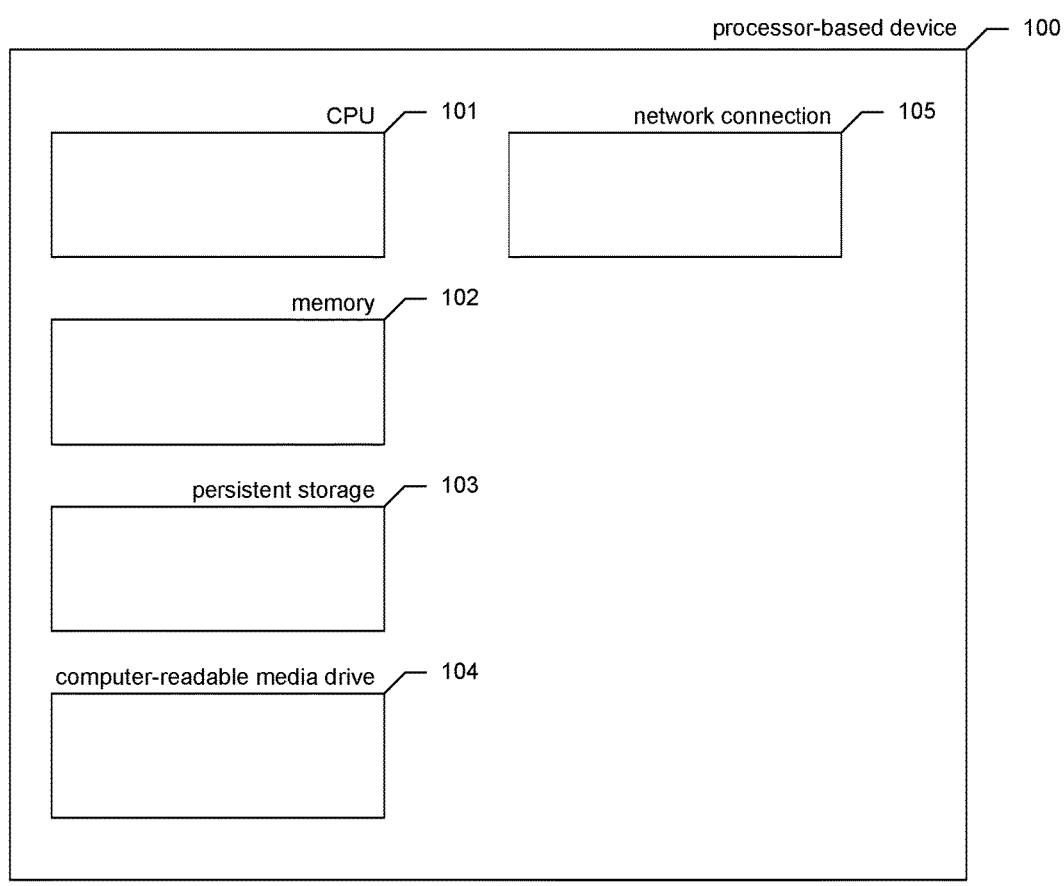
FIG. 1 is a block diagram showing some of the components typically incorporated in at least some of the computer systems and other devices on which the facility operates.

The inventors have recognized that the flexibility of graph databases, subject-predicate-object databases, and triplestores noted above is in many cases mismatched with data updating mechanisms and data querying mechanisms commonly used with these databases, which impose greater discipline on aspects of datatyping, including the notion of "cardinality."

Cardinality, as used herein, refers to the number of values that an entity can have for a particular property. For example, in a database in which the property "social security number" can have at most one value for each person, the "social security number" property is referred to as having a "scalar," or "single-value" cardinality level. In a database in which the property "telephone number" can have multiple values for a single person, the "telephone number" property is referred to as having a "collection," "multiple-value," or "array" cardinality level.

While graph databases, subject-predicate-object databases, and triplestores typically do not discern or store cardinalities for properties or predicates, data updating mechanisms and data querying mechanisms commonly used with these databases are typically aware of the cardinality of properties and predicates, and often include semantics in update requests and queries—optional or mandatory—that identify properties or predicates included in the update requests and queries as having a particular cardinality level. The inventors have recognized that the typical failure of graph databases, subject-predicate-object databases, and triplestores to track the cardinality of the properties and predicates that they store interferes with their ability to respond appropriately to some expressions of cardinality included in the semantics of update requests and queries these databases receive. In particular, these mechanisms may seek to update or query on a property or predicate that should be a scalar as a collection, or vice versa. When the database treats these incorrect cardinality levels as if they are correct, they deprive the clients accessing the data through these mechanisms of information about the correct cardinality of a property or predicate, making it more likely that the data will become corrupted with respect to the proper cardinality of properties or predicates, and that the results of queries will be misinterpreted.

To ameliorate the disadvantages associated with this mismatch observed by the inventors, they have conceived and reduced to practice a software and/or hardware facility for maintaining a cardinality schema to manage indications of property or predicate cardinality on behalf of a database that is indifferent to the cardinality of the properties or predicates stored within it ("the facility"). To simplify the discussion herein, graph databases, subject-predicate-object databases, triplestores, and databases of other types that are indifferent to cardinality are referred to hereafter as "graph databases," or simply as "databases." For the same reason, both properties of entities and predicates of subjects are referred to hereafter as "properties." Also, the cardinality schema is sometimes referred to herein as a "cardinality context," or simply a "context."

In an example of the operation of the facility, an update mechanism directs an update request to the database that adds a social security number property to a particular entity, at a time when none of the entities in the database have a social security number property. When this update request is received, the facility checks whether the cardinality schema that it maintains on behalf of the database indicates a cardinality level for the social security number property. Upon determining that it does not, the facility determines that the update request includes cardinality semantics that indicate that the social security number property is a scalar property—that is, for each entity, it has at most one value. Based on this determination, the facility adds an indication to its cardinality schema that the social security number property has the scalar cardinality level. If a future update request uses cardinality semantics that indicate that the Social Security number property is a collection property—that is, it can have any number of values for a single entity—the facility responds to the update request with an error. In cases where such an error is based upon an incorrect cardinality indication in the cardinality schema, update mechanism can explicitly correct the cardinality indication in the cardinality schema. Similarly, if a future query is received from a query mechanism that contains cardinality semantics for a property that don't match the property's cardinality indication in the cardinality schema, the facility response to the query mechanism with an error.

In some embodiments, the facility automatically adds cardinality indications to its cardinality schema based upon cardinalities for properties that the facility determines from update operations involving those properties. For example, in some embodiments, the facility automatically adds a cardinality indication to the cardinality schema based upon determining the cardinality of a property from cardinality semantics included in an update operation. In some embodiments, the facility automatically adds a cardinality indication to the cardinality schema based upon determining the cardinality of a property from the number of values associated with a property in update operation. In some embodiments, the facility permits client applications to directly manipulate the cardinality indications in the cardinality schema by explicitly creating or correcting the cardinality level indicated for particular property.

In some embodiments, where a query or update request uses cardinality semantics for a property that are inconsistent with the cardinality schema's cardinality indication for that property, the facility rejects the query or update request.

In some embodiments, the facility uses its cardinality schema to automatically complete incomplete queries to contain proper cardinality semantics for each property that is involved. For example, in some embodiments, the facility performs this automatic completion in the context of a code editor, another software development tool, or a field for entry and query to be performed immediately.

By performing some or all of the ways described above, the facility substantially increases the likelihood that the database will continue to contain cardinality-appropriate data; that update and query tools will be more accurately apprised of the cardinality of properties; that client applications will control the cardinality information available about properties to be more accurate; and/or that those forming queries for inclusion in code or immediate execution will do so with the proper cardinality semantics.

Also, by performing in some or all of the ways described above and storing, organizing, and/or accessing information relating to a database in an efficient way, the facility meaningfully reduces the hardware resources needed to store and exploit this information, including, for example: reducing the amount of storage space needed to store the information relating to the database; and reducing the number of processing cycles needed to store, retrieve, or process the information relating to the database. This allows programs making use of the facility to execute on computer systems that have less storage and processing capacity, occupy less physical space, consume less energy, produce less heat, and are less expensive to acquire and operate. Also, such a computer system can respond to user requests pertaining to information relating to a graph database with less latency, producing a better user experience and allowing users to do a particular amount of work in less time.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In some embodiments, the facility executes on one or more layers of virtual machines, which in turn execute on a physical computer system or similar device. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
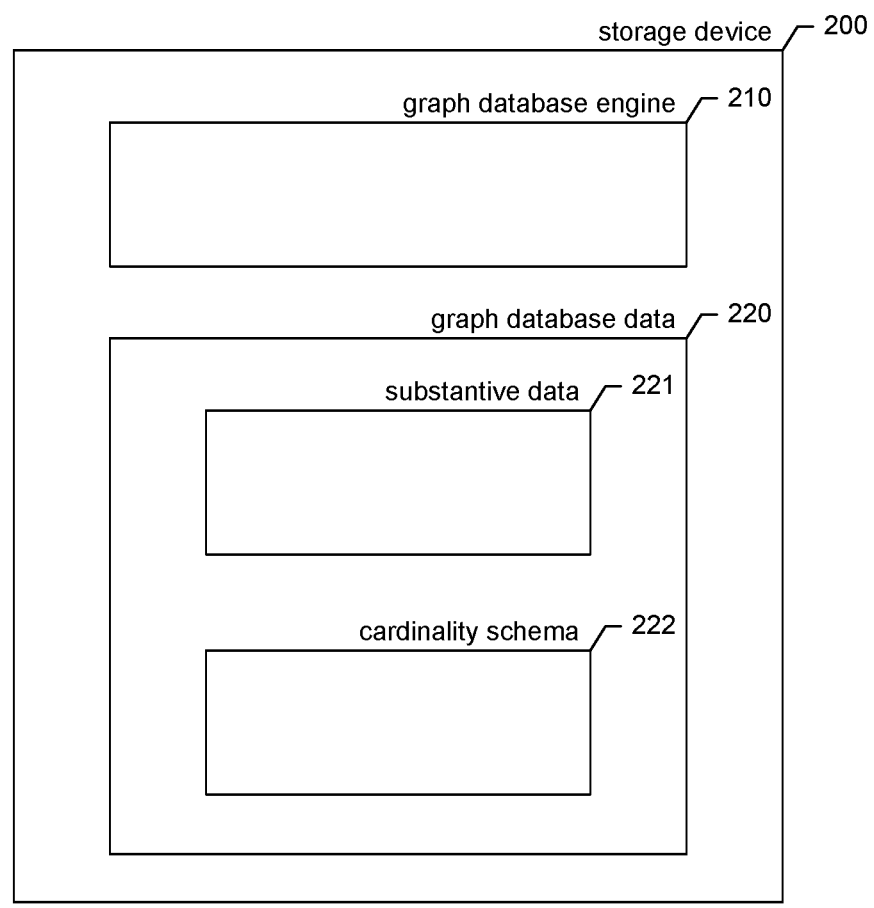
FIG. 2 is a storage diagram showing data and code stored by the facility in some embodiments.

FIG. 2 is a storage diagram showing data and code stored by the facility in some embodiments. A storage device 200—such as memory 102, persistent storage 103, or media accessed via a computer readable media drive 104—stores an engine 210 and data 224 for a graph database or a database of another similar type. The graph database data includes substantive data 221 stored natively by the database—such as substantive graphs, triples, or other representations—and a cardinality schema 222 stored separately from the substantive data. In some embodiments (not shown), the facility stores the cardinality schema outside the graph database data, and/or manages the cardinality schema using code other than the graph database engine.

Figure 3:
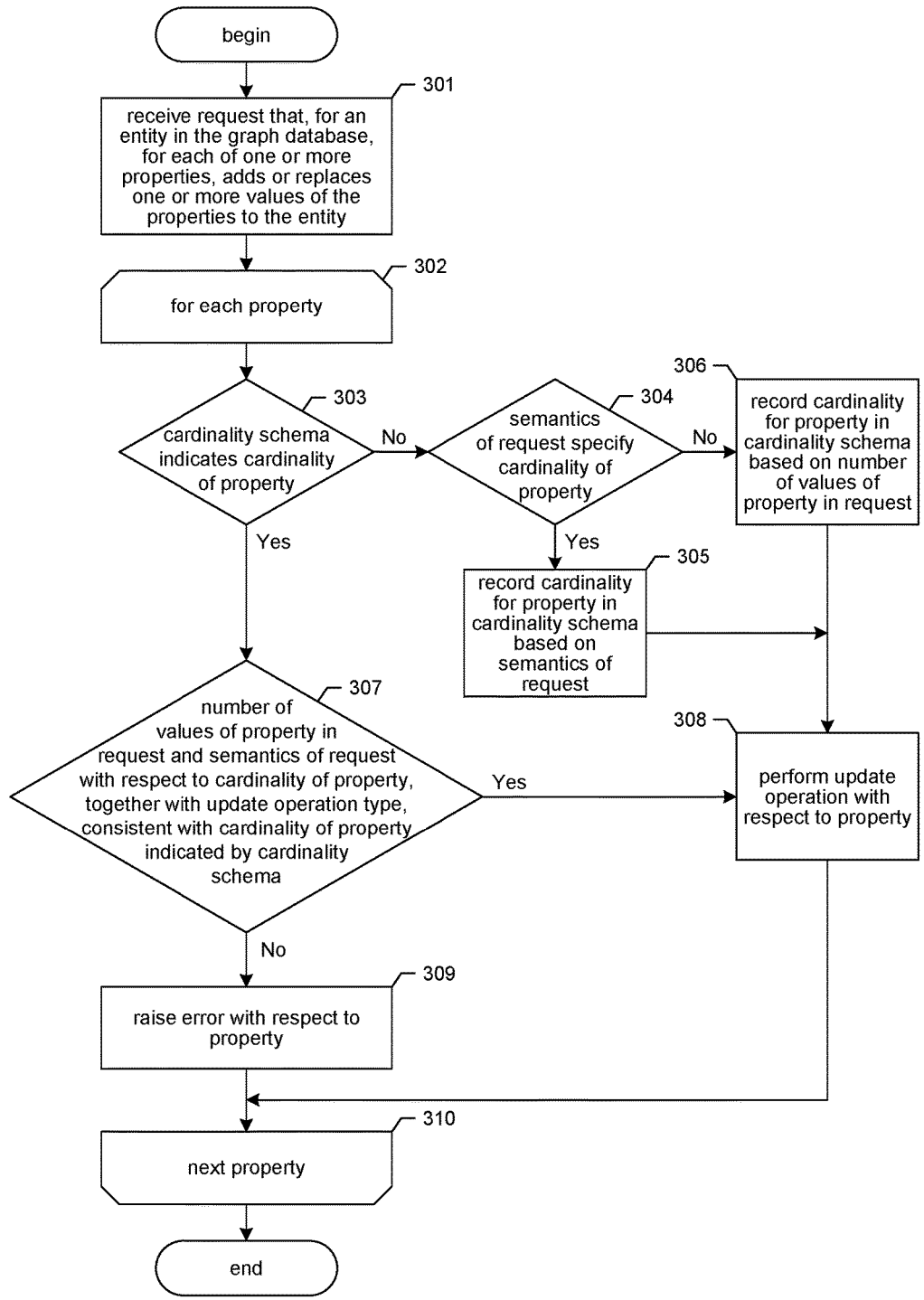
FIG. 3 is a flow diagram showing a process performed by the facility in some embodiments to process update requests.

FIG. 3 is a flow diagram showing a process performed by the facility in some embodiments to process update requests. In act 301, the facility receives an update request. The update request identifies an entity in a graph database. For each of one or more properties, the request specifies adding or replacing one or more values for the property to the entity. In some embodiments, where the update request does not identify an existing entity, the request is interpreted to create an entity having the specified property values.

Table 1A below shows a sample update request received at a time when the cardinality schema and database content are both empty. Because it does not identify any existing entity in the state of the database at the time the request is received, it is interpreted to create a new entity having the single value "Compilers: Principles, Techniques and Tools" for a "title" property; the two values "Alfred V. Aho" and "Ravi Sethi" for an "author" property; and the single value "978-0321486813" for an "isbn" property. The sample update request in Table 1A also includes cardinality semantics: the brackets surrounding values of the "author" property are semantic indications that the "author" property has the collection cardinality level; the absence of brackets surrounding values of the "title" and "isbn" properties are semantic indications that these two properties have the scalar cardinality level.

TABLE 1A

Request 1: POST to Content

{
    "title": "Compilers: Principles, Techniques and Tools",
    "author": [ "Alfred V. Aho", "Ravi Sethi" ],
    "isbn": "978-0321486813"
}

In acts 302-310, the facility loops through each property for which the update request specifies values. In the request shown above in Table 1A, these are "title," "author," and "isbn." In act 303, if the cardinality schema already indicates the cardinality of the current property, then the facility continues in act 307, else the facility continues in act 304. In act 304, if the semantics of the received update request specify the cardinality of the current property, then the facility continues in act 305, else the facility continues in act 306. In act 305, the facility records the cardinality for the current property in the cardinality schema based upon the cardinality semantics of the request. After act 305, the facility continues in act 308.

FIG. 4 is a table diagram showing logic used by the facility in some embodiments to perform act 305. A table 400 shows, in the situation where the facility receives an update request specifying one or more values of a property called "X" whose cardinality is not indicated by the cardinality schema, that the update operation always succeeds for the "X" property. The table also shows, for various combinations of the cardinality indicated for the property by semantics of the update request (rows 401 and 402) with number of values of the property (columns 412, 413, and 414), the cardinality recorded in the cardinality schema for the "X" property. For example, the entry at the intersection of row 401 with column 412 indicates that, when an update request to post a single value to the scalar property "X" is received when the database contains no values for the property "X" and the cardinality schema contains no cardinality indication for the property "X," the update operation succeeds with respect to the "X" property, and that the facility records an indication in the cardinality schema indicating that the "X" property has the scalar cardinality level.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

Returning to FIG. 3, in act 306, the facility records the cardinality for the property in the cardinality schema based instead upon the number of values of the property specified by the request. After act 306, the facility continues in act 308. In act 307, if the number of values specified for the property in the request and the semantics of the request with respect to the cardinality of the property, together with the update operation type, are consistent with the cardinality of the property indicated by the cardinality schema, then the facility continues in act 308, else the facility continues in act 309.

FIGS. 5 and 6 are table diagrams showing logic used by the facility in some embodiments to perform act 307. In FIG. 5, a table 500 shows, in the situation where the facility receives an update request specifying one or more values of a property called "X" whose cardinality level is indicated by the cardinality schema to be scalar, whether the update request succeeds or fails in various situations. Each of these situations is a combination of the cardinality indicated for the property by semantics of the update request (rows 501 and 502) with number of values of the property (columns 512, 513, and 514). For example, the entry at the intersection of row 401 with column 513 indicates that, when an update request to post a single value to the scalar property "X" is received when the database contains one value for the property "X" and the context schema indicates that "X" is a scalar property, the update operation fails with respect to the "X" property.

In FIG. 6, a table 600 shows, in the situation where the facility receives an update request specifying one or more values of a property called "X" whose cardinality level is indicated by the cardinality schema to be collection, whether the update request succeeds or fails in various situations. Each of these situations is a combination of the cardinality indicated for the property by semantics of the update request (rows 601 and 602) with number of values of the property (columns 612, 613, and 614). In particular, all of the entries of the table indicate that the update operation always succeeds with respect to the "X" property. This is because the update operation "post" is additive, in the sense that it adds any specified property values not already possessed by the entity that is the subjection of the post operation. The post of any number of values is always proper with respect to a property that is known to be a collection.

Returning to FIG. 3, in act 308, the facility performs the update operation with respect to the property—that is, it associates the specified values with the property for the entity explicitly or implicitly identified by the update request. This association is performed in a way specified by the particular update operation identified by the update request; for example, for a Post update operation, the facility adds a new value for the combination of entity and property, while for a Patch update operation, the facility replaces any existing value(s) for the combination of entity and property with the value or values specified by the update request. After act 308, the facility continues in act 310. In act 309, the facility raises an error with respect to the current property. In act 310, where additional properties remain to be processed, the facility continues in 302 the process the next property. After act 310, this process concludes. In some embodiments (not shown), the facility organizes the activities shown in FIG. 3 such that cardinality validation is first performed across all of the properties included in the update request, and processing the requested update occurs only if validation succeeds for all of the included properties.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

For each of the properties in the sample update request shown in Table 1A, the facility traverses through acts 303 and 304 to act 305—based upon the cardinality schema being empty and the request containing property cardinality semantics for all of the properties—to record in the cardinality schema a cardinality level for each of the three properties that is based upon the request's cardinality semantics, as shown below in Table 1B. In particular, the cardinality schema reflects that (1) the author property is a collection property, as the result of brackets surrounding the list of values specified for it by the update request, and that (2) the title and isbn properties are scalar properties, as a result of brackets not surrounding the value specified for either property by the update request.

TABLE 1B

| Schema State | | |
|---|---|---|
| subject | predicate | object |
| title | type | ScalarProperty |
| author | type | CollectionProperty |
| isbn | type | ScalarProperty |

For each of the properties in the sample update request shown in Table 1A, the facility further traverses from act 305 to act 308, where the facility performs the requested update operation with respect to the property. The resulting state of the database, which was empty at the time the request was received, is shown below in Table 1C. The entity "1234" that is the subject of each of the triple show in Table 1C is assigned by the database to uniquely identify the entity created in response to the request. In some embodiments, the database returns information about this created entity to facilitate future access to it by the client applications, such as the identifier "1234."

TABLE 1C

| Content State | | |
|---|---|---|
| subject | predicate | object |
| 1234 | title | "Compilers: Principles, Techniques and Tools" |
| 1234 | author | "Alfred V. Aho" |
| 1234 | author | "Ravi Sethi" |
| 1234 | isbn | "978-0321486813" |

Figure 7:
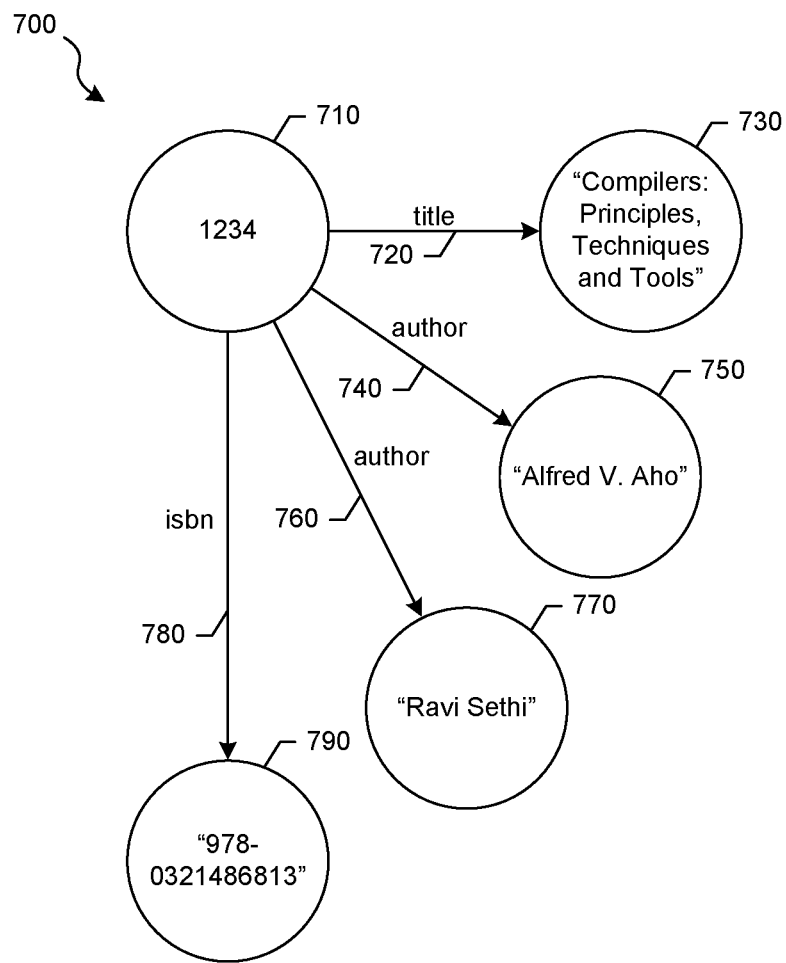
FIG. 7 is a graph diagram showing the contents of the database corresponding to Table 1C in graph form.

FIG. 7 is a graph diagram showing the contents of the database corresponding to Table 1C in graph form. The graph 700 has an entity node 710 created in response to the request. The entity node is connected to property value node 730 by edge 720, connoting that the "1234" entity has the value "Compilers: Principles, Techniques and Tools" for the "title" property. Edges 740 and 760 each connect the entity node to a different property value node (450 or 770) for the "author" property. Finally, edge 780 connects the entity node to property value node 790, connoting that the "1234" entity has the value "978-0321486813" for the "isbn" property. As noted above, content can generally be straightforwardly converted in either direction between subject-predicate-object database form and graph database form.

Five more sample requests that build on the one shown in Table 1A are shown in Tables 2A, 3A, 4A, 5A, and 6A, and discussed below. Tables 2B, 3B, 4B, 5B, and 6B track the state of the cardinality schema in response to each additional sample request, while Tables 2C, 3C, 4C, 5C, and 6C track the corresponding state of the database.

Table 2A below shows a second content post request, received at a time when the cardinality schema has the state shown in Table 1B and the content has the state shown in Table 1C.

TABLE 2A

Request 2: POST to Content

{
    "author": "Jeffrey D. Ullman",
    "publisher": "Addison-Wesley Publishing Company",
    "isbn": "978-0321486813"
}

When the facility receives the update request shown in Table 2A, it uses the value of the isbn property specified by the request to correlate the update request with entity 1234, which has this value of the isbn property. The effect of the request shown in Table 2A on the cardinality schema is shown below in Table 2B, where an indication is added that a new publisher property has the scalar cardinality schema, as a result of the fact that the value specified for the new publisher property is not surrounded by brackets in the update request, and thus has cardinality semantics indicating the scalar cardinality level.

TABLE 2B

| Schema State | | |
|---|---|---|
| subject | predicate | object |
| title | type | ScalarProperty |
| author | type | CollectionProperty |
| isbn | type | ScalarProperty |
| publisher | type | ScalarProperty |

The update request shown in Table 2A causes the facility to update the content as shown below in Table 2C. In particular, a third value of the author property is added, as well as a value for the new publisher property.

TABLE 2C

Content State

| subject | predicate | object |
|---|---|---|
| 1234 | title | "Compilers: Principles, Techniques and Tools" |
| 1234 | author | "Alfred V. Aho" |
| 1234 | author | "Ravi Sethi" |
| 1234 | isbn | "978-0321486813" |
| 1234 | author | "Jeffrey D. Ullman" |
| 1234 | publisher | "Addison-Wesley Publishing Company" |

Table 3A below shows a third content post request, received at a time when the cardinality schema has the state shown in Table 2B and the content has the state shown in Table 2C. The content publisher request seeks to add the value "Monica S. Lam" to the values of the author property.

TABLE 3A

Request 3: POST to Content

{
    "author": "Monica S. Lam",
    "isbn": "978-0321486813"
}

This update has no effect on the cardinality schema; thus, Table 3B below is unchanged from Table 2B above.

TABLE 3B

Schema State

| subject | predicate | object |
|---|---|---|
| title | type | ScalarProperty |
| author | type | CollectionProperty |
| isbn | type | ScalarProperty |
| publisher | type | ScalarProperty |

The update is consistent with the collection cardinality level indicated for the author property by the cardinality schema (Properties having the collection cardinality level can have any number of values for a single entity.), and thus is applied to the content state. Table 3C below shows the addition of the new value for the author property.

TABLE 3C

Content State

| subject | predicate | object |
|---|---|---|
| 1234 | title | "Compilers: Principles, Techniques and Tools" |
| 1234 | author | "Alfred V. Aho" |
| 1234 | author | "Ravi Sethi" |
| 1234 | isbn | "978-0321486813" |
| 1234 | author | "Jeffrey D. Ullman" |
| 1234 | publisher | "Addison-Wesley Publishing Company" |
| 1234 | author | "Monica S. Lam" |

Table 4A below shows a fourth content post request, received at a time when the cardinality schema has the state shown in Table 3B and the content has the state shown in Table 3C.

TABLE 4A

Request 4: POST to Content

{
    "publisher": "Bellevue Publishing Company",
    "isbn": "978-0321486813"
}

When this update request is received, the facility rejects it, as it constitutes a request to add a second value to the title property, which is indicated by the cardinality schema shown in Table 3C above to have the scalar cardinality level. (Properties having the scalar cardinality level can have only one value for a single entity.) This rejected request has no effect on the cardinality schema or the content, as shown below in Tables 4B and 4C, respectively.

TABLE 4B

Schema State

| subject | predicate | object |
|---|---|---|
| title | type | ScalarProperty |
| author | type | CollectionProperty |
| isbn | type | ScalarProperty |
| publisher | type | ScalarProperty |

TABLE 4C

Content State

Figure 8:
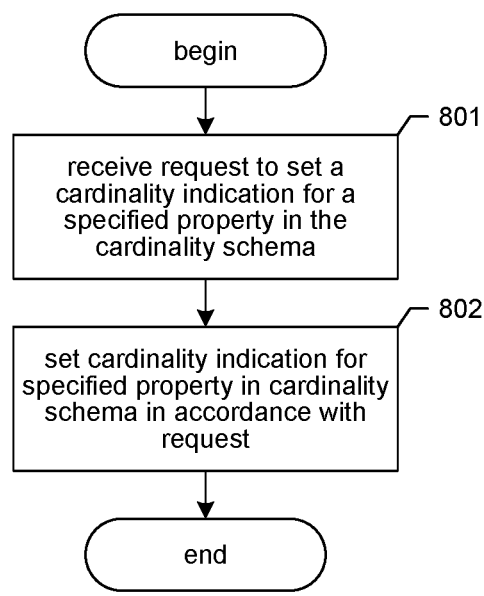
FIG. 8 is a flow diagram showing a process performed by the facility in some embodiments to alter the cardinality schema in response to an explicit request from a client application.

| subject | predicate | object |
|---|---|---|
| 1234 | title | "Compilers: Principles, Techniques and Tools" |
| 1234 | author | "Alfred V. Aho" |
| 1234 | author | "Ravi Sethi" |
| 1234 | isbn | "978-0321486813" |
| 1234 | author | "Jeffrey D. Ullman" |
| 1234 | publisher | "Addison-Wesley Publishing Company" |
| 1234 | author | "Monica S. Lam" |

Where a client application discovers by the rejection of an update request on the basis of a cardinality level mismatch that the cardinality schema is out of sync with the cardinality level intended by the client application for a particular property, the client application can explicitly alter the cardinality indication for that property in the cardinality schema. FIG. 8 is a flow diagram showing a process performed by the facility in some embodiments to alter the cardinality schema in response to an explicit request from a client application. In act 801, the facility receives a request to set a cardinality indication for a specified property in the cardinality schema to a particular cardinality level, such as scalar or collection. In act 802, the facility sets the cardinality indication for the property specified by the request to the cardinality level property specified by the request. In some embodiments (not shown), the facility performs one or more validation tests before setting the cardinality indication in act 802. For example, in some embodiments, the facility determines whether, for some or all of the entities in the database, the number of values for the specified attribute is compatible with the cardinality level specified for this attribute by the request. In various embodiments, when such tests identify inconsistencies, the facility responds by failing the update operation; warning the client application; logging the inconsistencies; etc. After act 802, this process concludes.

Table 5A below shows a fifth update request, this one a request to patch the cardinality schema to change the cardinality indication for the publisher property from scalar to collection. It is received at a time when the cardinality schema has the state shown in Table 4B and the content has the state shown in Table 4C.

TABLE 5A

Request 5: PATCH to Schema

{
   "id": "publisher",
   "type": "CollectionProperty"
}

In response to the request, the facility changes the cardinality indication for the publisher property in the context schema from scalar to collection, as shown below in Table 5B.

TABLE 5B

Schema State

| subject | predicate | object |
|---|---|---|
| title | type | ScalarProperty |
| author | type | CollectionProperty |
| isbn | type | ScalarProperty |
| publisher | type | CollectionProperty |

The facility does not alter the content state in response to this request; thus, Table 5C below matches Table 4C above.

TABLE 5C

Content State

| subject | predicate | object |
|---|---|---|
| 1234 | title | "Compilers: Principles, Techniques and Tools" |
| 1234 | author | "Alfred V. Aho" |
| 1234 | author | "Ravi Sethi" |
| 1234 | isbn | "978-0321486813" |
| 1234 | author | "Jeffrey D. Ullman" |
| 1234 | publisher | "Addison-Wesley Publishing Company" |
| 1234 | author | "Monica S. Lam" |

Table 6A below shows a sixth update request, this one a repetition of the fourth request seeking to add an additional value to the publisher schema that is shown in Table 4A above. It is received at a time when the cardinality schema has the state shown in Table 5B and the content has the state shown in Table 5C.

TABLE 6A

Request 6: POST to Content

{
   "publisher": "Bellevue Publishing Company",
   "isbn": "978-0321486813"
}

The request does not alter the cardinality schema; thus, Table 6B below matches Table 5B above.

TABLE 6B

Schema State

| subject | predicate | object |
|---|---|---|
| title | type | ScalarProperty |
| author | type | CollectionProperty |
| isbn | type | ScalarProperty |
| publisher | type | CollectionProperty |

Because the cardinality indication for the publisher property has been changed to collection, which can accommodate multiple values, the update is successful, adding the value "Bellevue Publishing Company" for the publisher property to the existing value of "Addison-Wesley Publishing Company" as shown below in Table 6C.

TABLE 6C

Content State

| subject | predicate | object |
|---|---|---|
| 1234 | title | "Compilers: Principles, Techniques and Tools" |
| 1234 | author | "Alfred V. Aho" |
| 1234 | author | "Ravi Sethi" |
| 1234 | isbn | "978-0321486813" |
| 1234 | author | "Jeffrey D. Ullman" |
| 1234 | publisher | "Addison-Wesley Publishing Company" |
| 1234 | author | "Monica S. Lam" |
| 1234 | publisher | "Bellevue Publishing Company" |

Figure 9:
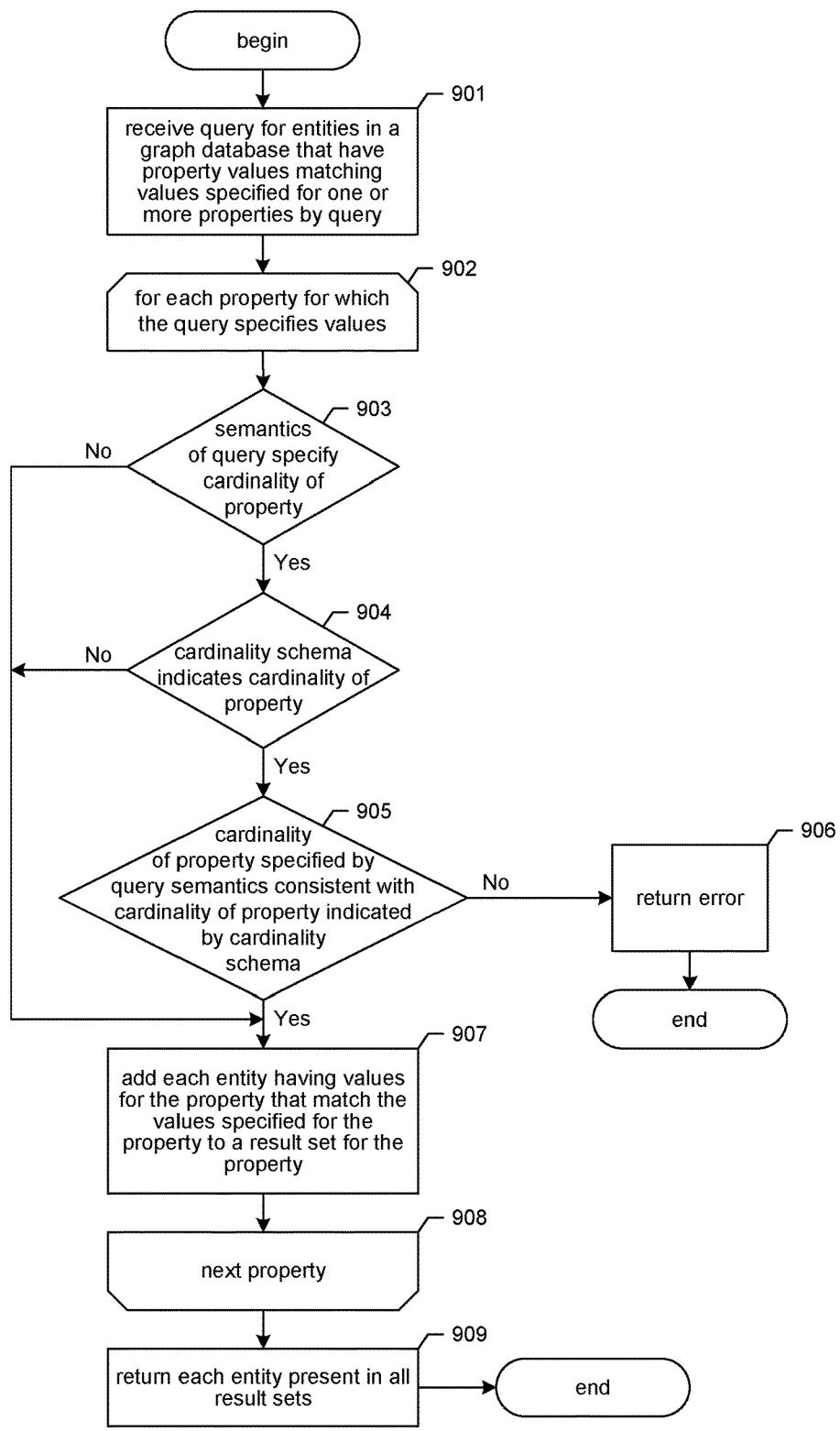
FIG. 9 is a flow diagram showing a process performed by the facility in some embodiments to respond to a query against the database.

FIG. 9 is a flow diagram showing a process performed by the facility in some embodiments to respond to a query against the database. In act 901, the facility receives a query seeking to identify entities that in a graph database or database of another type that have property values matching value specified for one or more properties by the query. In acts 902-908, the facility loops through each property for which the query specifies one or more values. In act 903, if semantics of the query specify a cardinality level for the property, then the facility continues in act 904, else the facility continues in act 907. In act 904, if the cardinality schema indicates a cardinality level for the property, then the facility continues in act 905, else the facility continues in act 907. In act 905, if the cardinality level of the property specified by the query semantics is consistent with the cardinality of the property indicated by the cardinality schema, then the facility continues in act 907, else the facility continues in act 906 to return an error in conclude the process. In act 907, the facility adds to a result set for the current property each entity in the database that has values for the current property that match the value specified for this property by the query. In act 908, if additional properties remain to be processed, then the facility continues in act 902 to address the next property, else the facility continues in act 909. In act 909, the facility returns a result that includes each entity that is present in all of the result sets established in act 907. After act 909, this process concludes.

FIGS. 10-12 are table diagrams showing logic used by the facility in some embodiments to perform acts 905 and 907. In FIG. 10, a table 1000 shows, in the situation where the facility receives a query specifying one or more values of a property called "X" whose cardinality level is not indicated by the cardinality schema, whether the query is in error, and whether it matches an entity having a particular combination of one or more values for the property. In particular, the table specifies such a result for each a combination of the cardinality indicated for the property by semantics of the query (rows 1001 and 1002) with number of values and particular values of the property associated with a particular entity (columns 1012-1016). For example, the entry at the intersection of row 1001 with column 1014 indicates that, when a query specifying a single value 42 for the scalar property "X" is received when the database contains the multiple values 42 and 64 for the property "X" for the current entity and the context schema indicates no cardinality level for the property "X," the query fails for the entity with respect to the "X" property, as the actual number of values for the property and entity is mismatched with the cardinality semantics of the query.

In FIG. 11, a table 1100 shows, in the situation where the facility receives a query specifying one or more values of a property called "X" whose cardinality level is indicated to be scalar by the cardinality schema, whether the query is in error, and whether it matches an entity having a particular combination of one or more values for the property. In particular, the table specifies such a result for each a combination of the cardinality indicated for the property by semantics of the query (rows 1101 and 1102) with number of values and particular values of the property associated with a particular entity (columns 1112-1116). For example, the entry at the intersection of row 1102 with column 1112 indicates that, when a query specifying a single value 42 for the collection property "X" is received when the database contains the multiple no values for the property "X" for the current entity, and the context schema indicates the scalar cardinality level for the property "X," the query fails for the entity with respect to the "X" property, as the cardinality schema indication for the property is mismatched with the cardinality semantics of the query.

In FIG. 12, a table 1200 shows, in the situation where the facility receives a query specifying one or more values of a property called "X" whose cardinality level is indicated to be collection by the cardinality schema, whether the query is in error, and whether it matches an entity having a particular combination of one or more values for the property. In particular, the table specifies such a result for each a combination of the cardinality indicated for the property by semantics of the query (rows 1201 and 1202) with number of values and particular values of the property associated with a particular entity (columns 1212-1216). For example, the entry at the intersection of row 1201 with column 1212 indicates that, when a query specifying a single value 42 for the scalar property "X" is received when the database contains the multiple no values for the property "X" for the current entity, and the context schema indicates the collection cardinality level for the property "X," the query fails for the entity with respect to the "X" property, as the cardinality schema indication for the property is mismatched with the cardinality semantics of the query.

Figure 13:
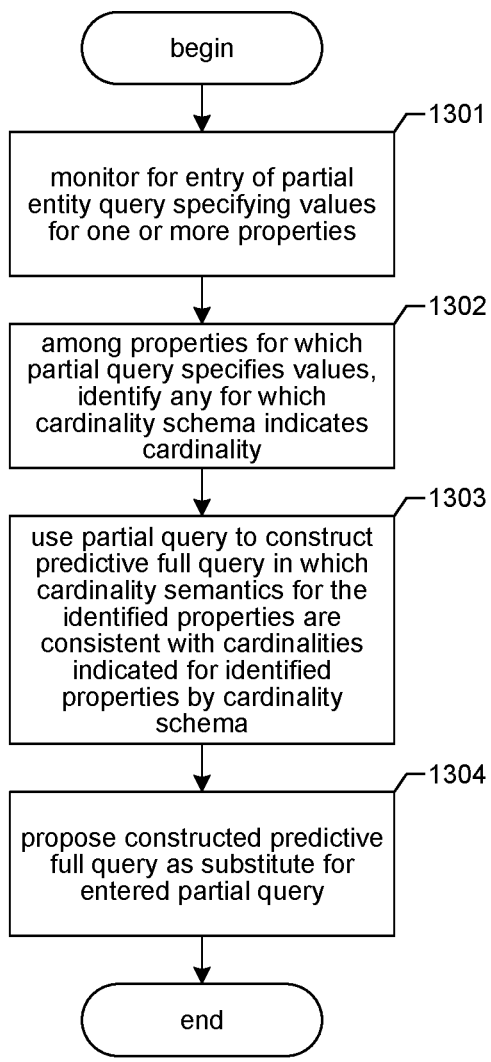
FIG. 13 is a flow diagram showing a process performed by the facility in some embodiments to automatically complete incomplete queries using proper cardinality semantics for the involved properties.

FIG. 13 is a flow diagram showing a process performed by the facility in some embodiments to automatically complete incomplete queries using proper cardinality semantics for the involved properties. In act 1301, the facility monitors for the entry of a partial entity query that specifies values for one or more properties. In various embodiments, the facility performs this monitoring in various data entry contexts such as in a code editor, in a software development tool another type, in a real-time query field, etc.

Figure 14:
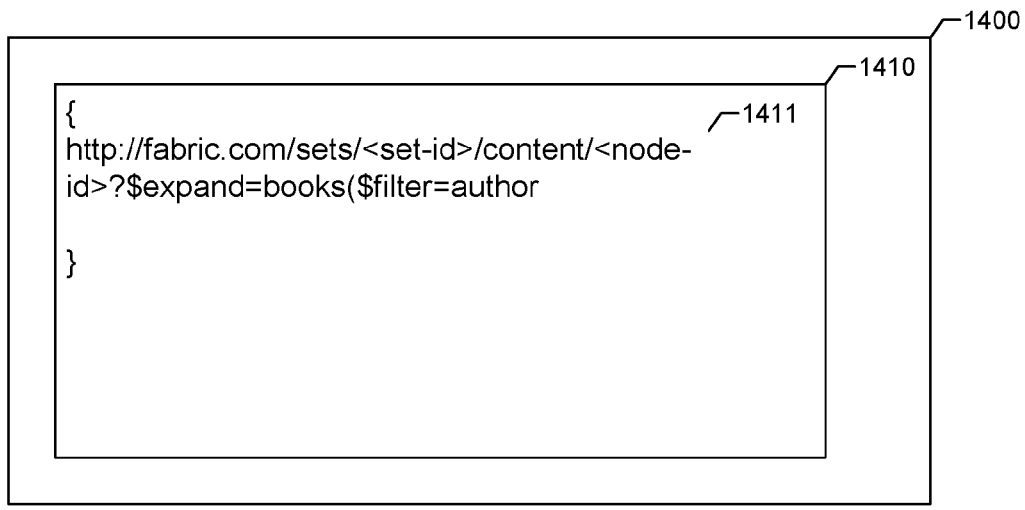
FIG. 14 is a display diagram showing a sample display depicting the entry of an incomplete query.

FIG. 14 is a display diagram showing a sample display depicting the entry of an incomplete query. The display 1400 includes a code editor window 1410 into which the user has entered incomplete query 1411. The incomplete query includes text "$filter=author" indicating that the completed query is intended to select entities on the basis of their values of an author property.

Returning to FIG. 13, in act 1302, among the properties for which the partial query identified in act 1301 specifies values, the facility identifies any of these properties for which the cardinality schema indicates the property's cardinality. In act 1303, the facility uses the identified partial query to construct, on a predictive basis, a full query in which cardinality semantics for the properties identified in act 1302 are consistent with the cardinality levels indicated for these properties by the cardinality schema. In act 1304, the facility proposes the full query constructed in act 1303 as a substitute for the partial query entered by the user. After act 1304, this process concludes.

Figure 15:
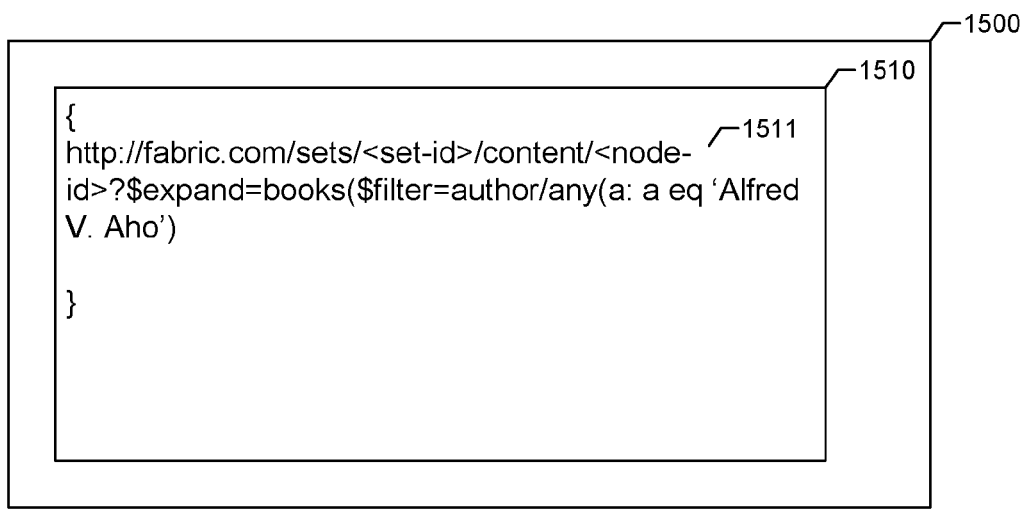
FIG. 15 is a display diagram showing a sample display presented by the facility in some embodiments to propose a constructed predictive full query as a substitute for an entered partial query

FIG. 15 is a display diagram showing a sample display presented by the facility in some embodiments to propose a constructed predictive full query as a substitute for an entered partial query. It can be seen that the facility has replaced partial query 1411 with completed query 1511. In particular, the facility has replaced the text "$filter=author" with the text "filter=author/any(a: a eq 'Alfred V. Aho')". This replacement text includes a portion "/any(a:a . . . )" that constitutes the cardinality semantics for the collection cardinality level indicated by the cardinality schema for the author attribute. (See Table 6B.) In some embodiments (not shown), rather than including the value for the author property to be searched for 'Alfred V. Aho' in the full query, the facility includes a blank that prompts the user to type this value. In some embodiments (not shown), the facility waits to generate a completed query until the partial query includes a value for each included property; for example, the facility would wait until the partial query said "http://fabric.com/sets/<set-id>/content/<node-id>?$expand=books($filter=author eq 'Alfred V. Aho')"; the facility would then correct these scalar cardinality semantics for the author property to the collection cardinality semantics in completed query 1511.

As an additional example, the facility in some embodiments would complete a partial query directed to the scalar isbn property as "http://fabric.com/sets/<set-id>/content/<node-id>?$expand=books($filter=isbn eq '978-0321486813')", which contains the correct scalar cardinality semantics for the isbn property.

In some embodiments, the facility provides a method in a computing system, comprising: receiving a query against a distinguished property contained by a graph database, the query reflecting a level of cardinality for the distinguished property; determining that the level of cardinality for the distinguished property reflected by the query is inconsistent with a level of cardinality of the distinguished property stored distinctly from the graph database in a cardinality schema for the graph database; and in response to determining that the level of cardinality for the distinguished property reflected by the query is inconsistent with the level of cardinality of the distinguished field stored in the cardinality schema, responding to the received query with an error indication.

In some embodiments, the facility provides one or more instances of computer-readable media collectively having contents configured to cause a computing system to perform a method, the method comprising: receiving a query against a distinguished property contained by a graph database, the query reflecting a level of cardinality for the distinguished property; determining that the level of cardinality for the distinguished property reflected by the query is inconsistent with a level of cardinality of the distinguished property stored distinctly from the graph database in a cardinality schema for the graph database; and in response to determining that the level of cardinality for the distinguished property reflected by the query is inconsistent with the level of cardinality of the distinguished field stored in the cardinality schema, responding to the received query with an error indication.

In some embodiments, the facility provides one or more instances of computer-readable media collectively having contents configured to cause a computing system to perform a method, the method comprising: receiving a first update request for a graph database, the first update request identifying an entity, a property of the entity, and at least one value to be associated with the combination of the entity and the property, the semantics of the update request reflecting a first cardinality level for the property; determining that the first cardinality level for the property reflected by the semantics of the first update request does not match a second cardinality level stored for the property in a cardinality schema; and in response to the determining, omitting to associate the at least one value with the combination of the entity and the property in accordance with the first update request.

In some embodiments, the facility provides a method in a computing system, comprising: receiving a first update request for a graph database, the first update request identifying an entity, a property of the entity, and at least one value to be associated with the combination of the entity and the property, the semantics of the update request reflecting a first cardinality level for the property; determining that the first cardinality level for the property reflected by the semantics of the first update request does not match a second cardinality level stored for the property in a cardinality schema; and in response to the determining, omitting to associate the at least one value with the combination of the entity and the property in accordance with the first update request.

In some embodiments, the facility provides one or more instances of computer-readable media collectively storing a cardinality context repository data structure for a triplestore, the data structure comprising: for each of one or more predicates that, for a subject in the triplestore, can relate at least one object to the subject: an indication of whether the predicate can relate more than one object to a single subject, such that the contents of the data store are usable to reject requests against the triplestore for a predicate that are inconsistent with the data structure's indication for the predicate.

In some embodiments, the facility provides a method in a computing system, comprising: receiving input specifying a partial query against a distinguished property in a graph database; accessing a cardinality schema to determine a cardinality of the distinguished property in the graph database; generating from the partial query specified by the user input a completed query whose semantics reflect the cardinality determined for the distinguished property; and presenting the generated completed query as a predictive completion of the partial query.

In some embodiments, the facility provides one or more instances of computer-readable media collectively having contents configured to cause a computing system to perform a method, the method comprising: receiving input specifying a partial query against a distinguished property in a graph database; accessing a cardinality schema to determine a cardinality of the distinguished property in the graph database; generating from the partial query specified by the user input a completed query whose semantics reflect the cardinality determined for the distinguished property; and presenting the generated completed query as a predictive completion of the partial query.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system, comprising:
   receiving a query against a distinguished attribute contained by a graph database, the query reflecting a level of cardinality for the distinguished attribute;
   determining that the level of cardinality for the distinguished attribute reflected by the query is inconsistent with a level of cardinality of the distinguished attribute stored distinctly from the graph database in a cardinality schema for the graph database;
   in response to determining that the level of cardinality for the distinguished attribute reflected by the query is inconsistent with the level of cardinality of the distinguished field stored in the cardinality schema, altering the cardinality schema based on the level of cardinality for the distinguished attribute reflected by the query;
   receiving a second query against the distinguished attribute contained by the graph database, the second query identifying an entity, the distinguished attribute, and at least one value to be associated with the combination of the entity and the distinguished attribute, the semantics of the query reflecting a second cardinality level for the distinguished attribute;
   determining that the second cardinality level for the distinguished attribute reflected by the semantics of the first query matches the first cardinality level stored for the distinguished attribute in the cardinality schema; and
   in response to determining the matching, associate the at least one value with the combination of the entity and the distinguished attribute in accordance with the second query.

2. The method of claim 1 wherein:
   the level of cardinality for the distinguished attribute reflected by the query is scalar and the level of cardinality of the distinguished field stored in the cardinality schema is collection, or the level of cardinality for the distinguished attribute reflected by the query is schema and the level of cardinality of the distinguished field stored in the cardinality schema is scalar.

3. The method of claim 1, further comprising:
   in response to determining that the level of cardinality for the distinguished attribute reflected by the query is inconsistent with the level of cardinality of the distinguished field stored in the cardinality schema, omitting to assess whether the query against the distinguished attribute is satisfied for any entity in the graph database.

4. One or more instances of computer-readable media collectively having contents configured to cause a computing system to perform a method, the method comprising:
   receiving a first update request for a graph database, the first update request identifying an entity, an attribute of the entity, and at least one value to be associated with the combination of the entity and the attribute, the semantics of the update request reflecting a first cardinality level for the attribute;
   determining that the first cardinality level for the attribute reflected by the semantics of the first update request does not match a second cardinality level stored for the attribute in a cardinality schema;

in response to the determining, altering the cardinality schema to store the first cardinality level for the attribute;

receiving a second update request for the graph database, the second update request identifying the entity, the attribute of the entity, and at least one value to be associated with the combination of the entity and the attribute, the semantics of the update request reflecting a second cardinality level for the attribute;

determining that the second cardinality level for the attribute reflected by the semantics of the first update request matches the first cardinality level stored for the attribute in the cardinality schema; and in response to determining the matching, associate the at least one value with the combination of the entity and the attribute in accordance with the second update request.

5. The instances of computer-readable medium of claim 4, further comprising responding to the update request with an error.

6. The instances of computer-readable medium of claim 4 wherein the determining determines that the first cardinality level for the attribute reflected by the semantics of the first update request, together with the number of values already associated with the combination of the entity and the attribute, does not match a second cardinality level stored for the attribute in a cardinality schema.

7. The instances of computer-readable medium of claim 4 wherein the determining determines that the first cardinality level for the attribute reflected by the semantics of the first update request, together with the number of values to be associated with the combination of the entity and the attribute by the update request, does not match a second cardinality level stored for the attribute in a cardinality schema.

8. The instances of computer-readable medium of claim 4 wherein the determining determines that the first cardinality level for the attribute reflected by the semantics of the first update request, together with an update operation type specified by the update request with respect to the attribute, does not match a second cardinality level stored for the attribute in a cardinality schema.

9. One or more instances of computer-readable media collectively storing a cardinality context repository data structure for a triplestore, the data structure comprising:

for each of one or more predicates that, for a subject in the triplestore, can relate at least one object to the subject:
an indication of whether the predicate can relate more than one object to a single subject, such that the contents of the data structure are usable to alter the cardinality context repository data structure based on a level of cardinality reflected by requests against the triplestore for a predicate that are inconsistent with the data structure's indication for the predicate, and such that, after the altering, the contents of the data structure are usable to
process an update request for the triplestore identifying an entity, an attribute of the entity, and at least one value to be associated with the combination of the entity and the attribute, the semantics of the update request reflecting a first cardinality level for the attribute, and in response to determining that the first cardinality level for the attribute reflected by the semantics of the first update request matches a cardinality level of an altered predicate stored for the attribute in the triplestore, associate the at least one value with the combination of the entity and the attribute in accordance with the update request.

10. The instances of computer-readable medium of claim 9 wherein an indication in the data structure for a distinguished predicate was derived from a distinguished request to use the distinguished predicate to relate an object to a subject in the triplestore.

11. The instances of computer-readable medium of claim 10 wherein the indication in the data structure for the distinguished predicate was derived from semantics of the distinguished request.

12. The instances of computer-readable medium of claim 10 wherein the indication in the data structure for the distinguished predicate was derived from a pair of brackets enclosing one or more objects in the distinguished request.

13. The instances of computer-readable medium of claim 9 wherein an indication in the data structure for a distinguished predicate was inferred from a distinguished request to use the distinguished predicate to relate a distinguished number of objects to a single subject.

14. The instances of computer-readable medium of claim 13 wherein the indication for the distinguished predicate is an indication that the predicate can relate more than one object to a single subject as the result of the distinguished request being a request to use the distinguished predicate to relate two or more objects to a single subject.

15. The instances of computer-readable medium of claim 13 wherein the indication for the distinguished predicate is an indication that the predicate cannot relate more than one object to a single subject as the result of the distinguished request being a request to use the distinguished predicate to relate only one object to a single subject.

16. The instances of computer-readable medium of claim 9 wherein an indication in the data structure for a distinguished predicate was derived from a distinguished request limited to specifying whether the distinguished predicate can relate more than one object to a single subject.

* * * * *